US012619637B2

(12) United States Patent
Takenaka

(10) Patent No.: US 12,619,637 B2
(45) Date of Patent: May 5, 2026

(54) INFORMATION PROCESSING DEVICE, INFORMATION PROCESSING SYSTEM, INFORMATION PROCESSING METHOD, AND PROGRAM

(71) Applicant: AT ROBOTICS INC., Tokyo (JP)

(72) Inventor: Tsukasa Takenaka, Tokyo (JP)

(73) Assignee: AT ROBOTICS INC. (JP)

( * ) Notice: Subject to any disclaimer, the term of this patent is extended or adjusted under 35 U.S.C. 154(b) by 405 days.

(21) Appl. No.: 18/037,265

(22) PCT Filed: Nov. 18, 2021

(86) PCT No.: PCT/JP2021/042500
§ 371 (c)(1),
(2) Date: May 16, 2023

(87) PCT Pub. No.: WO2022/107863
PCT Pub. Date: May 27, 2022

(65) Prior Publication Data
US 2024/0020325 A1     Jan. 18, 2024

(30) Foreign Application Priority Data

Nov. 20, 2020     (JP) ................................. 2020-193545

(51) Int. Cl.
*G10L 15/22* (2006.01)
*G06F 16/3329* (2025.01)
(Continued)

(52) U.S. Cl.
CPC ........ *G06F 16/3329* (2019.01); *G06F 16/338* (2019.01); *G06V 20/68* (2022.01); *G10L 15/22* (2013.01)

(58) Field of Classification Search
CPC ... G06F 16/3329; G06F 16/338; G06V 20/68; G10L 15/22; G06Q 10/08; G06Q 20/208;
(Continued)

(56) References Cited

U.S. PATENT DOCUMENTS 11,068,715 B1 *   7/2021   Zuo ..................... G06Q 30/0627
2003/0095032 A1   5/2003   Hoshino et al.
(Continued)

FOREIGN PATENT DOCUMENTS

JP          2005-327077 A       11/2005
JP          2011-113417 A        6/2011
(Continued)

OTHER PUBLICATIONS

European Search Report issued in the corresponding European Patent Application No. 21894735.6; dated Jan. 3, 2024 (total 9 pages).
(Continued)

*Primary Examiner* — Mark Villena
(74) *Attorney, Agent, or Firm* — Harness, Dickey & Pierce, P.L.C.

(57) ABSTRACT

An information processing device includes a controller. The controller reads information from a captured image including a prescribed mark on an object. The information includes object information pertaining to the object and connection information of a server device. Connection with the server device is made on the basis of the connection information. When a user inputs inquiry information regarding the object, the object information and the inquiry information regarding the object are sent to the server device. Response information generated by the server device on the basis of the inquiry information and the object information are received from the server device. The response information is output as a response from the object.

17 Claims, 7 Drawing Sheets

(51) Int. Cl.
G06F 16/338 (2019.01)
G06V 20/68 (2022.01)

(58) Field of Classification Search
CPC .............. G06Q 20/308; G06Q 20/322; G06Q 30/0623; G06Q 30/0631; G06Q 30/0639; G06Q 30/0641; G06Q 30/015; Y02P 80/10
See application file for complete search history.

(56) References Cited

U.S. PATENT DOCUMENTS

| | | | |
|---|---|---|---|
| 2009/0289764 A1 | 11/2009 | Chiu | |
| 2011/0145092 A1 | 6/2011 | Paradise et al. | |
| 2016/0163037 A1* | 6/2016 | Dehais | G06T 7/521 382/110 |
| 2016/0203352 A1 | 7/2016 | Marsico | |
| 2018/0197177 A1 | 7/2018 | Lee et al. | |
| 2019/0339840 A1* | 11/2019 | Park | G10L 15/00 |
| 2019/0347319 A1 | 11/2019 | Goyal et al. | |
| 2021/0035189 A1* | 2/2021 | Marietta | G06K 7/1413 |

FOREIGN PATENT DOCUMENTS

| | | |
|---|---|---|
| JP | 2014-074813 A | 4/2014 |
| JP | 2015-041438 A | 3/2015 |
| JP | 2018-005626 A | 1/2018 |
| JP | 2019-207564 A | 12/2019 |
| JP | 7175025 B2 | 11/2022 |

OTHER PUBLICATIONS

Office Action issued in the corresponding Japanese Patent Application No. 2022-174363; mailed on May 28, 2024 (total 16 pages).
Office Action Issued in Japanese Patent Application No. 2020-193545, Sep. 22, 2022 (13 Pages).
International Search Report of the ISA issued in PCT/JP2021/042500, mailed Feb. 22, 2022; ISA/JP. (7 Pages).

* cited by examiner

INFORMATION PROCESSING DEVICE, INFORMATION PROCESSING SYSTEM, INFORMATION PROCESSING METHOD, AND PROGRAM

CROSS REFERENCE TO RELATED APPLICATIONS

This application is a U.S. National Phase application under 35 U.S.C. 371 of International Application No. PCT/JP2021/042500, filed on Nov. 18, 2021, which claims priority to Japanese Patent Application No. 2020-193545, filed on Nov. 20, 2020. The entire disclosures of the above applications are expressly incorporated by reference herein.

BACKGROUND

Technical Field

The present invention relates to an information processing apparatus, an information processing system, an information processing method, and a program.

Related Art

With the spread of IoT (Internet of Things) technology, various apparatuses have come to be connected to the Internet. JP 2015-41438 A discloses a plurality of lighting apparatuses connected to the Internet.

However, not all subjects have a controller as well as a communication unit and are connected to the Internet. It is also costly to allow all subjects comprising a controller and a communication unit.

SUMMARY

According to an aspect of the present invention, an information processing apparatus is provided. The information processing apparatus comprises a controller. The controller is configured to read information from a captured image including a predetermined mark attached to a subject, wherein the information includes subject information on the subject and connection information on a server apparatus. The controller is configured to connect to the server apparatus based on the connection information. When inquiry information on inquiry for the subject is input by a user, the controller is configured to transmit the inquiry information and the subject information to the server apparatus. The controller is configured to receive from the server apparatus response information generated in the server apparatus based on the inquiry information and the subject information. Further, the controller is configured to output the response information as a response from the subject.

DETAILED DESCRIPTION

Hereinafter, embodiment of the present invention will be described with reference to the drawings. Various features described in the embodiment below can be combined with each other.

A program for realizing a software in the present embodiment may be provided as a non-transitory computer readable medium that can be read by a computer or may be provided for download from an external server or may be provided so that the program can be activated on an external computer to realize functions thereof on a client terminal (so-called cloud computing).

In the present embodiment, the "unit" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Further, the circuit in a broad sense is a circuit realized by combining at least an appropriate number of a circuit, a circuitry, a processor, a memory, or the like. In other words, it is a circuit includes application specific integrated circuit (ASIC), programmable logic device (e.g., simple programmable logic device (SPLD), complex programmable logic device (CPLD), field programmable gate array (FPGA)), or the like.

First Embodiment

1. System Configuration

Figure 1:
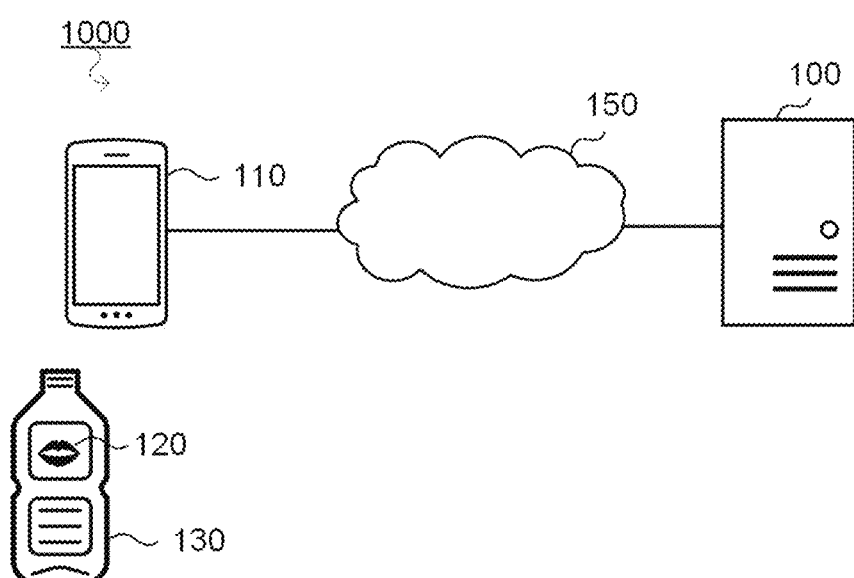
FIG. 1 is a diagram showing an example of a system configuration of an information processing system.

FIG. 1 is a diagram showing an example of a system configuration of an information processing system 1000. The information processing system 1000 comprises, as a system configuration, a server apparatus 100, a client apparatus 110, and a subject 130 to which a talk mark 120 is attached. The server apparatus 100 and the client apparatus 110 are communicatively connected via a network 150. The client apparatus 110 is an example of an information processing apparatus.

(Overview of Processing of Information Processing System 1000)

The client apparatus 110 is configured to image the talk mark 120 attached to the subject 130 based on user operation. The client apparatus 110 is configured to read information from a captured image including the talk mark 120 attached to the subject 130. Here, the information read by the client apparatus 110 includes information on the subject 130 and connection information on the server apparatus 100. The client apparatus 110 is configured to connect to the server apparatus 100 based on the connection information. The client apparatus 110 is configured to display an icon indicating the subject 130 based on the subject information. A user conduct inquiry for the subject 130 with respect to the displayed icon. When inquiry information on inquiry for the subject 130 is input by a user, the client apparatus 110 is configured to transmit the inquiry information on inquiry for the subject 130 and the subject information to the server apparatus 100. The client apparatus 110 is configured to receive from the server apparatus 100 response information generated in the server apparatus 100 based on the inquiry information and the subject information. Further, the client apparatus 110 is configured to output the response information as a response from the subject 130.

2. Hardware Configuration (1) Hardware Configuration of Client Apparatus 110

Figure 2:
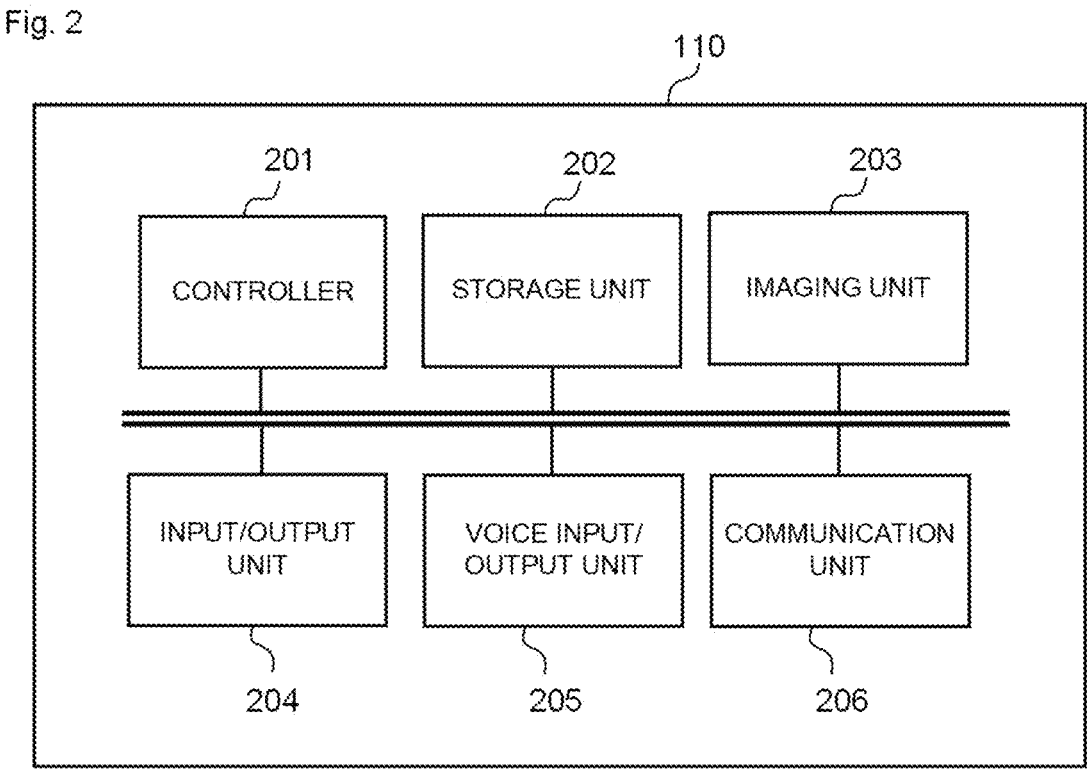
FIG. 2 is a diagram showing an example of a hardware configuration of a client apparatus.

FIG. 2 is a diagram showing an example of a hardware configuration of the client apparatus 110. The client apparatus 110 comprises, as a hardware configuration, a controller 201, a storage unit 202, an imaging unit 203, an input/output unit 204, an voice input/output unit 205, and a communication unit 206. The controller 201 is configured to control entire client apparatus 110. The storage unit 202 is configured to store program and data or the like used by the controller 201 in executing processing based on the program. Function of the client apparatus 110 is implemented by the controller 201 executing processing based on the program stored in the storage unit 202. The imaging unit 203 is configured to image a subject. In the present embodiment, the imaging unit 203 is configured to image the talk mark 120 attached to the subject 130. The talk mark is an example of a predetermined mark. The input/output unit 204 is configured to input information to the controller 201 in response to user operation and display information in response to information processing of the controller 201. The voice input/output unit 205 is configured to input voice of a user or output voice according to control of the controller 201. The communication unit 206 is configured to connect the client apparatus 110 to the network 150 and manage communication with other apparatus. The storage unit 202 is an example of a storage medium.

(2) Hardware Configuration of Server Apparatus 100

Figure 3:
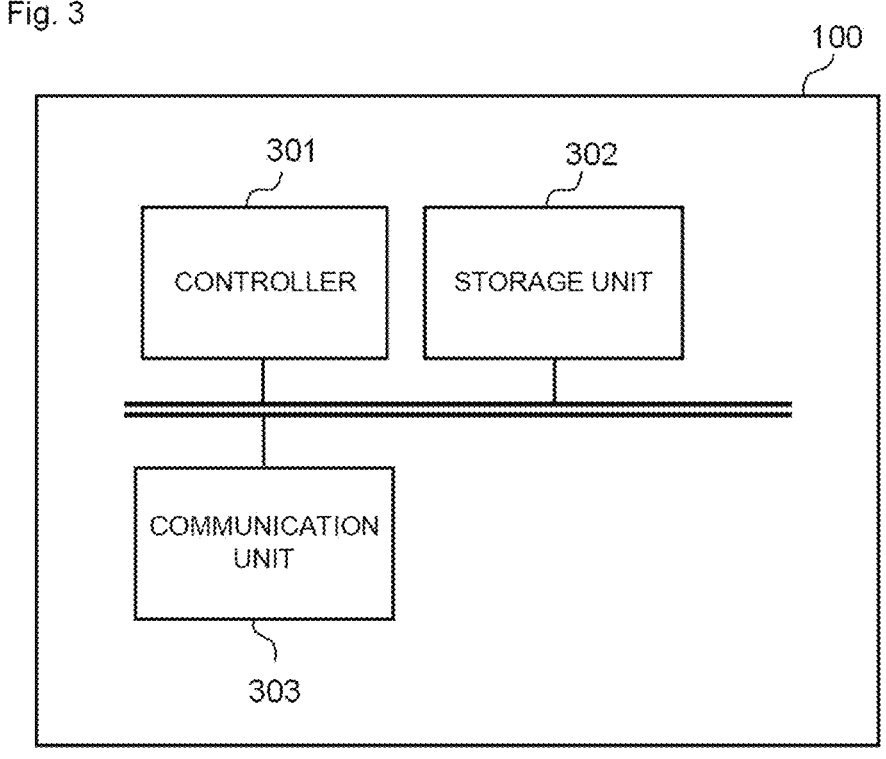
FIG. 3 is a diagram showing an example of a hardware configuration of a server apparatus.

FIG. 3 is a diagram showing an example of a hardware configuration of the server apparatus 100. The server apparatus 100 comprises, as a hardware configuration, a controller 301, a storage unit 302, and a communication unit 303. The controller 301 is configured to control entire server apparatus 100. The storage unit 302 is configured to store program and data or the like used by the controller 301 in executing processing based on the program. Function of the server apparatus 100 is implemented by the controller 301 executing processing based on the program stored in the storage unit 302. The communication unit 303 is configured to connect the server apparatus 100 to the network 150 and manage communication with other apparatus.

3. Information Processing

Figure 4:
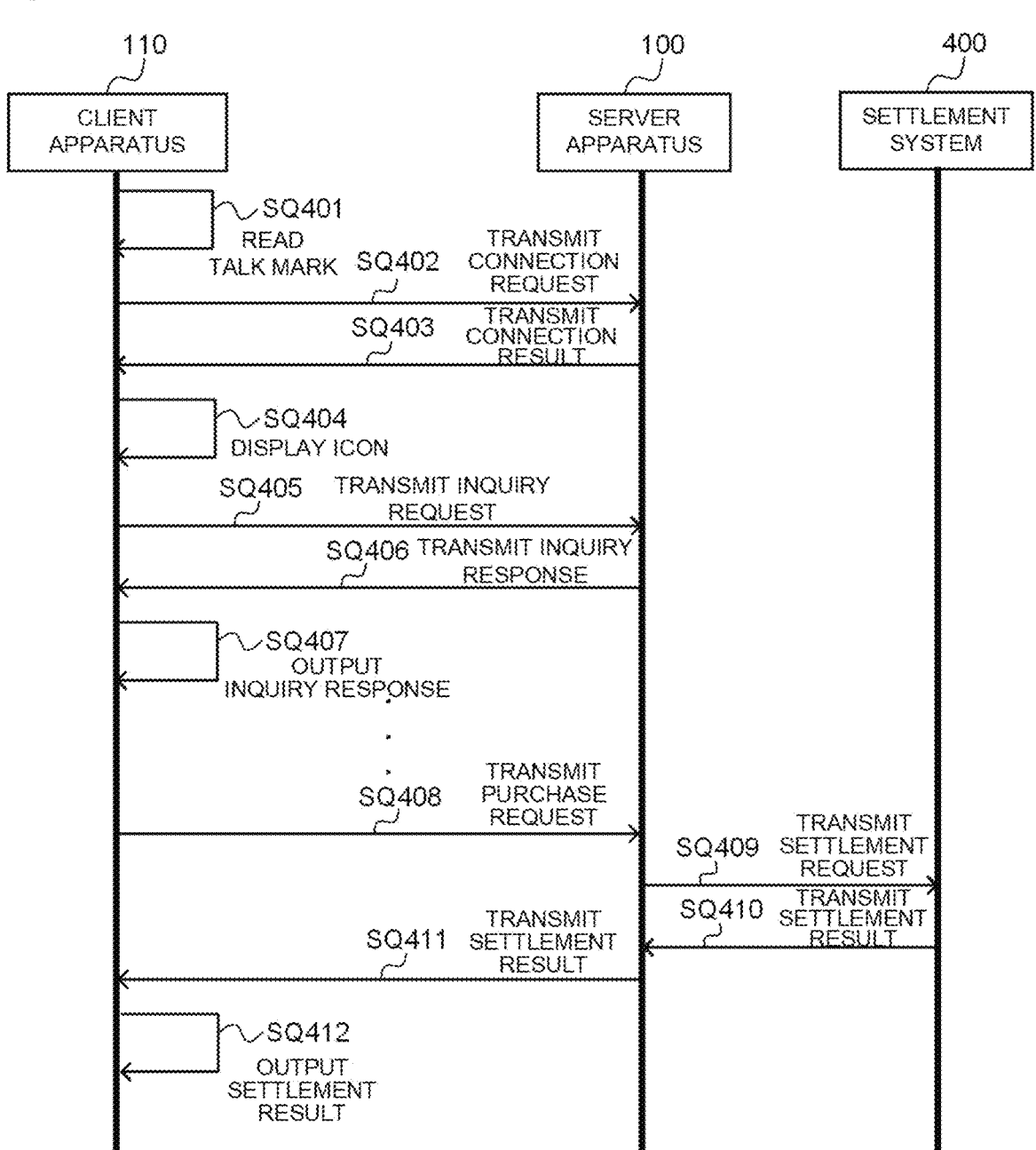
FIG. 4 is a sequence diagram showing an example of information processing of an information processing system.

FIG. 4 is a sequence diagram showing an example of information processing of an information processing system 1000.

In SQ401, the controller 201 images the talk mark 120 attached to the subject 130 based on user operation. In the present embodiment, food, especially a beverage in a plastic bottle will be described as an example of the subject 130. The controller 201 analyzes a captured image including the talk mark 120 attached to the subject 130 and reads information from the captured image. Here, the information read by the controller 201 includes subject information on the subject 130 and connection information on the server apparatus 100. The controller 201 connects with the server apparatus 100 based on the connection information.

In SQ402, the controller 201 transmits a connection request to the server apparatus 100 based on the connection information acquired in SQ401. The server apparatus 100 receives the connection request from the client apparatus 110. The server apparatus 100 executes processing regarding connection between the server apparatus 100 and the client apparatus 110 based on the connection request.

In SQ403, the server apparatus 100 transmits to the client apparatus 110 a connection result indicating whether the connection is successful. In the present embodiment, the server apparatus 100 will be described assuming that the connection is successful and a connection result indicating that the connection is successful is transmitted to the client apparatus 110.

Figure 5:
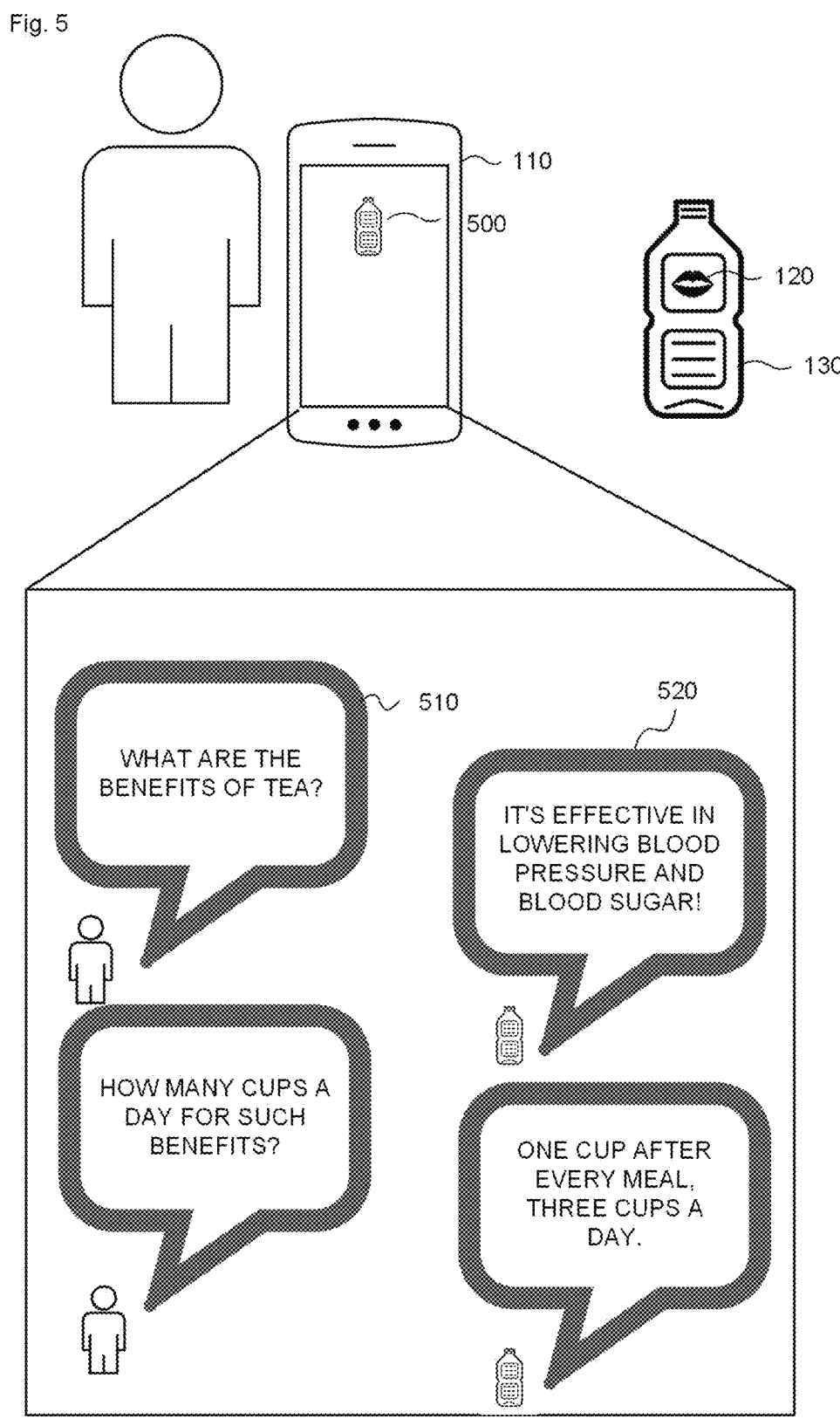
FIG. 5 is a diagram showing a concept of function of an information processing system.

In SQ404, the controller 201 displays an icon on the input/output unit 204 indicating a subject based on the captured image. FIG. 5 is a diagram showing a concept of function of the information processing system 1000. As shown in FIG. 5, an icon 500 is an example of an object indicating a subject based on a captured image. Here, an icon is a symbol that retains shape of an original object.

A user inputs an inquiry for the subject 130 displayed on the input/output unit 204, more specifically, for an icon corresponding to the subject 130. The inquiry is a question, a doubt, an inquiry, etc. for the subject 130 to which the talk mark 120 is attached. More specifically, when the subject 130 is food, the inquiry includes question regarding food information, inquiry regarding event information related to the food, inquiry regarding sales promotion information, etc. In addition, as described later, the inquiry may include a purchase request (settlement request), etc., indicating purchase intention for the subject 130. In the present embodiment, the client apparatus 110 inputs the inquiry of the user by voice. When the inquiry information on inquiry for the subject 130 is input through voice by the user via the voice input/output unit 205, the controller 201 converts the input inquiry information into text and displays it as a character string on the input/output unit 204 (510 in FIG. 5). Further, when the inquiry information on the inquiry for the subject 130 is input by the user, in SQ405, the controller 201 transmits to the server apparatus 100 an inquiry request including the inquiry information on the inquiry for the subject 130 (e.g., the inquiry information converted to text) and the subject information. The server apparatus 100 receives the inquiry request. In the example according to the present embodiment, the server apparatus 100 is a sales management server apparatus or the like that conducts sales management of food.

When receiving the inquiry request, the server apparatus 100 inputs the inquiry information on inquiry for the subject to a learned model identified by the subject information included in the inquiry request, and acquires response information on response to the inquiry for the subject from the learned model. The learned model is a learned model that has learned a correct answer to an inquiry for an assumed subject. If the subject is tea in a plastic bottle, the inquiry includes origin of the tea, producer of the tea, health benefit of the tea, recipe for cooking using the tea, how to drink the tea in a good way, or the like. Moreover, the learned model is prepared in advance for each subject and stored in the storage unit 302.

In SQ406, the server apparatus 100 generates an inquiry response including the acquired response information and transmits to the client apparatus 110.

In SQ407, the controller 201 outputs response information as a response from the subject 130. More specifically, the controller 201 outputs response information from the icon 500 as a response from the subject. In the present embodiment, the controller 201 outputs the response information by voice through the voice input/output unit 205, as is output from the icon 500 as a response from the subject. The controller 201 further displays the response information as a character string on the input/output unit 204 (520 in FIG. 5).

When the inquiry information is input by the user, the information processing system 1000 repeats processing from SQ405 to SQ407.

If a user intends to purchase the subject 130 as a result of inquiry, the user inputs purchase intention for the subject 130, or more specifically, for the icon corresponding to the subject 130, displayed on the input/output unit 204. The purchase intention is, for instance, a word indicating purchase intention, such as "buy" or "purchase". In the present embodiment, the client apparatus 110 inputs the purchase intention of the user through voice. When the purchase intention of the user for the subject 130 is input through voice via the voice input/output unit 205, in SQ408, the controller 201 transmits a purchase request including information indicating purchase of the subject, subject information identifying the subject 130, and identification information identifying the client apparatus 110 to the server apparatus 100.

When receiving the purchase request, the server apparatus 100 specifies the user based on the identification information identifying the client apparatus 110 included in the purchase request, and specifies settlement information or the like that the user has previously registered. The settlement information includes, for instance, a credit card number or a bank name and an account number of a bank account, etc. In SQ409, the server apparatus 100 transmits a settlement request including the settlement information, a price of the subject 130 identified by subject identification information, etc. to a settlement system 400 that performs settlement based on the specified settlement information.

In SQ410, the server apparatus 100 receives a result of settlement processing from the settlement system 400. In the present embodiment, the server apparatus 100 is described as receiving information indicating that the settlement is completed. In the present embodiment, the server apparatus 100 and the settlement system 400 are configured separately, but the server apparatus 100 may include function of the settlement system 400.

In SQ411, the server apparatus 100 transmits the result of settlement processing to the client apparatus 110. The controller 201 receives the result of settlement processing from the server apparatus 100. That is, the controller 201 receives from the server apparatus 100 the result of settlement processing processed by the server apparatus 100 based on the information indicating purchase of the subject, the subject information, and the identification information identifying the client apparatus 110.

In SQ412, the controller 201 outputs the results of settlement processing from the server apparatus 100. For instance, the controller 201 displays the result of settlement processing on the input/output unit 204 or outputs in voice through the voice input/output unit 205.

When the subject 130 is placed in a store and the settlement is completed, the server apparatus 100 transmits a signal indicating that the settlement has already been completed for the subject 130 to a gate installed at an exit of the store, in such a manner that the door does not close at the gate even if the user leaves with the subject 130. Alternatively, the server apparatus 100 transmits to the client apparatus 110 information indicating that the settlement for the subject 130 has already been completed. The client apparatus 110 may then store the information indicating that the settlement for the subject 130 has already been completed in the storage unit 202, and make the information readable at the gate. In this way, the door may not close at the gate even if the user leaves with the subject 130.

According to the processing in the present embodiment, the user can acquire information on a subject that is not connected to the Internet while conversing with the subject. Further, if the user likes the subject, the user can conduct settlement (or payment) and take the subject home without going through a cash register, etc.

If the user likes the subject 130, the user may purchase two or more subjects 130, and thus may transmit a request to the server apparatus 100 to have two or more subjects delivered to home. Upon receiving such a request, the server apparatus 100 performs the settlement described above based on information on number of subjects included in the request, and further transmits the request for delivery of the requested subject to an external server apparatus, etc. that manages delivery, as well as transmits information such as predetermined delivery address of user, information identifying the subject, the number of subjects to be delivered, or the like.

Further, according to the present embodiment, it is possible to provide a low-cost technology for presenting information while conversing with a subject. In addition, according to the present embodiment, processing of the server apparatus 100 or the client apparatus 110 can be accelerated due to simple configuration. Similarly, power saving for the server apparatus 100 or the client apparatus 110 can be achieved.

<First Variation>

Figure 6:
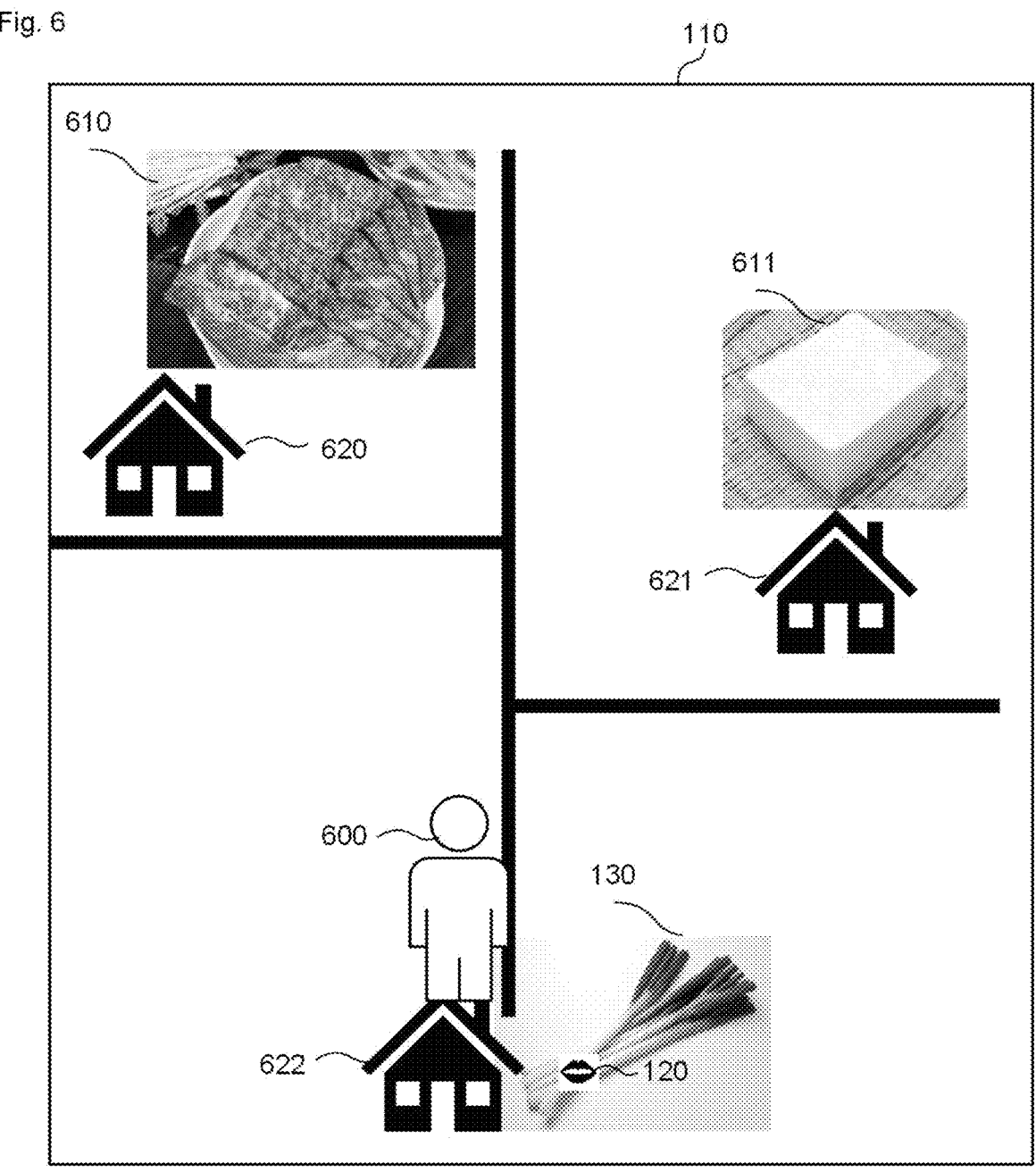
FIG. 6 is a diagram showing an example of a screen displayed on an input/output unit of a client apparatus according to a first variation, wherein the screen displays information on other subject included in a recipe and information on a sales location where the subject is sold.

A first variation will be described with food as an example of the subject 130. More specifically, as shown in FIG. 6, which will be described later, description will be given by taking a Welsh onion as an example.

When inquiry information on a recipe using food, which is the subject 130, is input by a user through voice via the voice input/output unit 205, the controller 201 transmits an inquiry request including the inquiry information on the recipe using the food and the subject information to the server apparatus 100. Then, the server apparatus 100 receives the inquiry request.

When receiving the inquiry request, the server apparatus 100 inputs inquiry information on a recipe using food to a learned model identified by subject information included in the inquiry request, and acquires response information on response to an inquiry for the recipe using the food from the learned model. The response information includes information on recipe using food.

The server apparatus 100 generates a response to the inquiry including the acquired response information and transmits to the client apparatus 110. The controller 201 receives the response to the inquiry from the server apparatus 100. That is, the controller 201 receives from the server apparatus 100 response information on the recipe generated in the server apparatus 100 based on the inquiry information and the subject information.

The controller 201 outputs response information as a response from the subject 130.

When a user wants to know a sales location where other food (other food) included in the output recipe is sold, the user may input an inquiry regarding the sales location where other food is sold. When inquiry information on the sales location where other food used in the recipe is sold is input by the user through voice via the voice input/output unit 205, the controller 201 transmits to the server apparatus 100 an inquiry request including the inquiry information on the location where other food used in the recipe is sold, other food information on the other food, food information on the subject 130, and location information on the client apparatus 110.

When receiving the inquiry request, the server apparatus 100 inputs to the learned model identified by the subject information included in the inquiry request the inquiry information regarding the location where other food used in the recipe is sold, other food information on the other food, and the location information on the client apparatus 110, and acquires, from the learned model, information on location where other food is sold within a predetermined distance from location of the client apparatus 110. The server apparatus 100 transmits an inquiry response including response information to the client apparatus 110 using the acquired information as response information. That is, the controller 201 receives, from the server apparatus 100, the response information regarding the location where other food is sold, which is generated in the server apparatus based on the inquiry information, the other food information, and the location information.

The controller 201 displays map information around a location where the client apparatus 110 is located on the input/output unit 204, and outputs information on the location where other food is sold on the map information based on the response information.

FIG. 6 is a diagram showing an example of a screen displayed on the input/output unit 204 of the client apparatus 110 according to the first variation, wherein the screen displays information on other subject included in a recipe and information on a sales location where the subject is sold.

In the example shown in FIG. 6, the subject 130 is a Welsh onion. A talk mark 120 is attached to the Welsh onion, which is the subject 130. An object 600 on a screen shown in FIG. 6 indicates a current location of a user. Further, the screen shown in FIG. 6 indicates that the user is at a grocery store 622 in a shopping district. In the screen of FIG. 6, beef 610 and tofu 611 are displayed as other foods included in a recipe for sukiyaki, which is one of dishes using Welsh onion. Moreover, the screen of FIG. 6 shows that the beef 610 is sold at a butcher shop 620 and tofu 611 is sold at a tofu shop 621.

The controller 201 generates the screen shown in FIG. 6 based on information from the server apparatus 100 and displays on the input/output unit 204, thereby allowing the user to immediately acquire information on location where other foods used in the recipe are sold.

In the first variation, the client apparatus 110 is described as generating a screen, but the server apparatus 100 may generate a screen and transmit to the client apparatus 110. The client apparatus 110 may then display the screen received from the server apparatus 100 on the input/output unit 204, etc.

<Second Variation>

Figure 7:
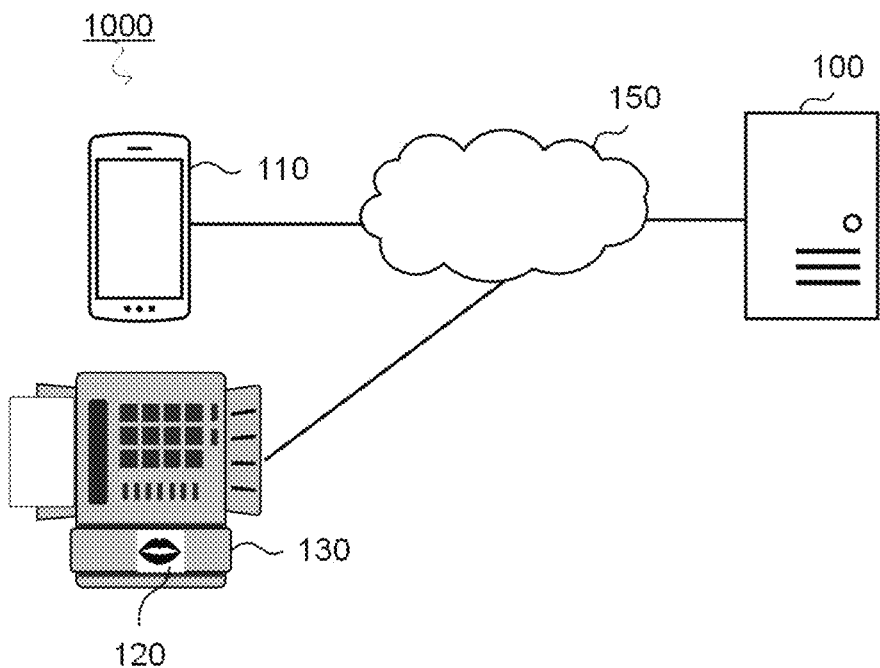
FIG. 7 is a diagram showing an example of a system configuration of an information processing system according to a second variation.

In the first embodiment and the first variation, food is described as an example of the subject 130. However, the subject to which the talk mark 120 is attached is not limited to food. For instance, the subject may be a car, a train, etc., or a machine in a production facility installed in a factory, etc. FIG. 7 shows an example of a system configuration of an information processing system 1000 according to a second variation. In the example shown in FIG. 7, a subject 130 is a machine. For example, if the machine is attached with a talk mark 120, a user can talk to the machine as if using the client apparatus 110 to acquire information such as operation status or power consumption of the machine. The user, who is able to understand transition of power consumption of the machine by the information obtained from the server apparatus 100, can change settings according to his/her purpose, for example, to stop operation of the machine at night.

When the subject 130 to which the talk mark 120 is attached is a machine of production facility, an inquiry by a user includes question regarding usage information, handling information, manipulation information, operation information, maintenance information, etc. on the facility. In such an example, the server apparatus 100 is a production management server apparatus or the like that performed management of the production facility.

As another example, the subject 130 to which the talk mark 120 is attached may be a logistics product. When the subject 130 is a logistics product, an inquiry by a user includes question regarding management information, routing information, maintenance information, etc. on the logistics product. In such an example, the server apparatus 100 is a logistics management server apparatus or the like that manages the logistics product.

<Third Variation>

In the above-described embodiment, etc., voice is described as an example of input. However, the input is not limited to voice and may be input of text information such as chat.

<Other Variation>

The client apparatus 110 receives, from the server apparatus 100, information regarding the subject 130 as information on the subject 130 to which the talk mark 120 is attached, such as campaign information on the subject, information on a store actually using the subject, etc., and outputs the information.

In addition, since the server apparatus 100 can identify a user who purchased the subject 130, the server apparatus 100 may transmit, to the user who purchased the subject 130, a location or URL, etc., where users who purchased the same subject can communicate with each other.

APPENDIX

The present invention may be provided in each of the following aspects.

The information processing apparatus, wherein: the controller is configured to allow an input/output unit to display an object indicating the subject based on the captured image, and output the response information from the object as a response from the subject.

The information processing apparatus, wherein: the controller is configured to when the inquiry information is input through voice by a user, transmit the inquiry information and the subject information to the server apparatus, and output the response information through voice from the object as a response from the subject.

The information processing apparatus, wherein: the controller is configured to when purchase intention regarding the subject is input by a user, transmit the information indicating purchase of the subject, the subject information, and identification information identifying the information processing apparatus to the server apparatus, receive from the server apparatus a result of settlement processing processed by the server apparatus based on the information indicating purchase of the subject, the subject information, and the identification information identifying the information processing apparatus, and output the result of the settlement processing.

The information processing apparatus, comprising: an imaging unit configured to image a predetermined mark attached to a subject, wherein the controller is configured to read information from a captured image including the predetermined mark imaged by the imaging unit.

The information processing apparatus, wherein: the subject is food.

The information processing apparatus, wherein: the controller is configured to when inquiry information on a recipe using the food is input by a user, transmit an inquiry request including the inquiry information on the recipe using the food and the subject information to the server apparatus, receive from the server apparatus response information on the recipe generated in the server apparatus based on the inquiry information and the subject information, and output the response information as a response from the subject.

The information processing apparatus, wherein: the controller is configured to when inquiry information on a location where other food used in the recipe is sold is input, transmit the inquiry information on the location where other food used in the recipe is sold, other food information on the other food, and location information on the information processing apparatus to the server apparatus, receive from the server apparatus response information on the location where the other food is sold, which is generated in the server apparatus based on the inquiry information, the other food information, and the location information, and output information on the location where other food is sold on map information based on the response information.

The information processing apparatus, wherein: the subject is a machine for a production equipment.

An information processing system, configured to: read information from a captured image including a predetermined mark attached to a subject, wherein the information includes subject information on the subject; when inquiry information on inquiry for the subject is input by a user, input the inquiry information to a learned model identified by the subject information, and acquire response information on response to the inquiry from the learned model; and output the response information as a response from the subject.

The information processing system, further configured to: allow an input/output unit to display an object indicating the subject based on the captured image, and output the response information from the object as a response from the subject.

The information processing system, further configured to: when the inquiry information is input through voice by a user, input the inquiry information and the subject information to a learned model, and acquire response information on a response to the inquiry from the learned model; and output the response information from the object as a response from the subject through voice.

An information processing method executed by an information processing apparatus, comprising: a first step of reading information from a captured image including a predetermined mark attached to a subject, wherein the information includes subject information on the subject and connection information on a server apparatus; a second step of connecting to the server apparatus based on the connection information; a third step of, when inquiry information on inquiry for the subject is input by a user, transmitting the inquiry information and the subject information to the server apparatus; a fourth step of receiving from the server apparatus response information generated in the server apparatus based on the inquiry information and the subject information; and a fifth step of outputting the response information as a response from the subject.

An information processing method executed by an information processing system, comprising: a first step of reading information from a captured image including a predetermined mark attached to a subject, wherein the information includes subject information on the subject; a second step of, when inquiry information on inquiry for the subject is input by a user, inputting the inquiry information and the subject information to a learned model, and acquiring response information on an inquiry to the subject from the learned model; and a third step of outputting the response information as a response from the subject.

A program configured to allow a computer to function as the controller of the information processing apparatus.

Of course, the present invention is not limited to the above aspects.

For instance, the present invention may be provided as a non-transitory computer readable medium that stores the program described above.

Moreover, the above-described embodiment and variations may be implemented in any combination.

The subject to which the talk mark 120 is attached may be a logistics product. For example, if the talk mark 120 is attached to a logistics product, a user can talk to the logistics product as if using the client apparatus 110 and acquire management information, routing information, maintenance information (support information), purchase information, settlement information, etc. on the logistics product.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. An information processing apparatus, comprising:
a controller configured to:
   read image information from a captured image including a predetermined mark attached to a subject, wherein the image information includes subject information on the subject and connection information on a server apparatus;
   connect to the server apparatus based on the connection information;
   transmit inquiry information on inquiry for the subject and the subject information to the server apparatus when the inquiry information is input by a user;
   receive from the server apparatus response information generated in the server apparatus based on the inquiry information and the subject information;
   cause an input/output unit to display an icon indicating the subject based on the captured image; and
   output the response information from the icon on the input/output unit as a response from the subject.

2. The information processing apparatus according to claim 1, wherein
the controller is further configured to:
   transmit the inquiry information and the subject information to the server apparatus when the inquiry information is input through voice by the user; and
   output the response information through voice from the icon as the response from the subject.

3. The information processing apparatus according to claim 1, wherein the controller is further configured to:

transmit purchase information indicating purchase intension regarding the subject, the subject information, and identification information identifying the information processing apparatus to the server apparatus when the purchase intention is input by the user;

receive from the server apparatus a result of settlement processing processed by the server apparatus based on the purchase information, the subject information, and the identification information and; and output the result of the settlement processing.

4. The information processing apparatus according to claim 1, further comprising:

an imaging unit configured to image the predetermined mark attached to the subject and generate the captured image.

5. The information processing apparatus according to claim 1, wherein the subject is food.

6. The information processing apparatus according to claim 5, wherein the controller is configured to:

transmit an inquiry request including food inquiry information on a recipe using the food and the subject information to the server apparatus when the food inquiry information is input by the user;

receive from the server apparatus food response information on the recipe generated in the server apparatus based on the food inquiry information and the subject information; and output the food response information as the response from the subject.

7. The information processing apparatus according to claim 6, wherein the controller is configured to:

transmit other food inquiry information on a location where other food used in the recipe is sold, other food information on the other food, and location information on the information processing apparatus to the server apparatus when the other food inquiry information is input;

receive from the server apparatus other food response information on the location where the other food is sold, which is generated in the server apparatus based on the other food inquiry information, the other food information, and the location information; and output food location information on the location where other food is sold on map information based on the other food response information.

8. The information processing apparatus according to claim 1, wherein the subject is a machine for a production equipment.

9. The information processing apparatus according to claim 1, wherein the input/output unit is a display having a screen, and the display is configured to display information in response to information processing of the controller.

10. An information processing system comprising:

a server apparatus; and an information processing apparatus including a controller, the controller being configured to:

read image information from a captured image including a predetermined mark attached to a subject, wherein the image information includes subject information on the subject;

receive inquiry information on inquiry for the subject that is input by a user;

transmit the inquiry information to the server apparatus, wherein the server apparatus is configured to:

input the inquiry information and the subject information to a learned model identified by the subject information;

acquire response information on response to the inquiry for the subject from the learned model; and transmit the response information to the information processing apparatus;

receive the response information from the server apparatus;

cause an input/output unit to display an icon indicating the subject based on the captured image; and output the response information from the icon on the input/output unit as a response from the subject.

11. The information processing system according to claim 10, wherein the controller is further configured to:

transmit the inquiry information and the subject information to the server apparatus when the inquiry information is input through voice by the user; and output the response information from the icon as the response from the subject through voice.

12. The information processing system according to claim 10, wherein the input/output unit is a display having a screen, and the display is configured to display information in response to information processing of the controller.

13. An information processing method for causing a controller to execute a process, the information processing method comprising executing on the controller the steps of:

reading image information from a captured image including a predetermined mark attached to a subject, wherein the image information includes subject information on the subject and connection information on a server apparatus;

of connecting to the server apparatus based on the connection information;

transmit inquiry information on inquiry for the subject and the subject information to the server apparatus when the inquiry information is input by a user;

receiving from the server apparatus response information generated in the server apparatus based on the inquiry information and the subject information;

causing an input/output unit to display an icon indicating the subject based on the captured image; and outputting the response information from the icon on the input/output unit as a response from the subject.

14. The information processing method according to claim 13, wherein the input/output unit is a display having a screen, and the display is configured to display information in response to information processing of the controller.

15. An information processing method for causing a plurality of controllers to execute a process, the information processing method comprising executing on the plurality of controllers the steps of:

reading, by an information processing apparatus, image information from a captured image including a predetermined mark attached to a subject, wherein the image information includes subject information on the subject;

receiving, by the information processing apparatus, inquiry information on inquiry for the subject that is input by a user;

transmitting, by the information processing apparatus, the inquiry information to the server apparatus;

inputting, by the server apparatus, the inquiry information and the subject information to a learned model;

acquiring, by the server apparatus, response information on response to the inquiry for the subject from the learned model;

transmitting, by the server apparatus, the response information to the information processing apparatus;

receiving, by the information processing apparatus, the response information from the server apparatus;

causing, by the information processing apparatus, an input/output unit to display an icon indicating the subject based on the captured image; and outputting the response information from the icon on the input/output unit as a response from the subject.

16. The information processing method according to claim 15, wherein the input/output unit is a display having a screen, and the display is configured to display information in response to information processing of the plurality of controllers.

17. A non-transitory computer readable medium storing a program, wherein the program is configured to cause a computer to function as the controller of the information processing apparatus according to claim 1.

* * * * *